(12) United States Patent
Bai et al.

(10) Patent No.: US 8,345,999 B2
(45) Date of Patent: Jan. 1, 2013

(54) SYSTEM AND METHOD FOR MONOCHROME BINARY COMPRESSION ON LEGACY DEVICES

(75) Inventors: Yingjun Bai, Pittsford, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1440 days.

(21) Appl. No.: 11/304,483

(22) Filed: Dec. 15, 2005

(65) Prior Publication Data

US 2007/0140575 A1  Jun. 21, 2007

(51) Int. Cl.
   *G06K 9/36* (2006.01)
   *G06K 9/46* (2006.01)
(52) U.S. Cl. ........................................ 382/244
(58) Field of Classification Search .................. None
   See application file for complete search history.

(56) References Cited

U.S. PATENT DOCUMENTS

| | | | | |
|---|---|---|---|---|
| 5,416,606 A * | 5/1995 | Katayama et al. | ............ | 382/239 |
| 5,422,736 A * | 6/1995 | Katayama | ..................... | 358/462 |
| 5,539,529 A * | 7/1996 | Merchant | ...................... | 358/400 |
| 5,613,016 A * | 3/1997 | Saitoh | ............................ | 382/174 |
| 5,638,498 A * | 6/1997 | Tyler et al. | .................... | 358/1.18 |
| 5,701,367 A * | 12/1997 | Koshi et al. | .................... | 382/239 |
| 5,778,092 A * | 7/1998 | MacLeod et al. | ............. | 382/176 |
| 5,991,515 A * | 11/1999 | Fall et al. | ..................... | 358/1.15 |
| 6,198,850 B1 * | 3/2001 | Banton | ......................... | 382/239 |
| 6,272,255 B2 * | 8/2001 | de Queiroz et al. | ........... | 382/239 |
| 6,633,670 B1 * | 10/2003 | Matthews | ...................... | 382/176 |
| 6,832,007 B1 * | 12/2004 | Zhang et al. | .................. | 382/257 |
| 6,941,024 B2 * | 9/2005 | Mukherjee | ..................... | 382/248 |
| 7,085,420 B2 * | 8/2006 | Mehrotra | ...................... | 382/232 |
| 2004/0114195 A1 | 6/2004 | Ebner et al. | | |
| 2005/0244060 A1 | 11/2005 | Nagarajan et al. | | |

OTHER PUBLICATIONS

Ono et al, "JBIG2-The Ultimate Bi-Level Image Coding Standard", Proceedings of 2000 International Conference on Image Processing, 2000.*

* cited by examiner

*Primary Examiner* — Samir Ahmed
(74) *Attorney, Agent, or Firm* — Duane C. Basch; Basch & Nickerson LLP

(57) ABSTRACT

Disclosed is a system and method for monochrome or binary compression, and more particularly compression of binary images segmented in a binary domain into at least two regions of different image types, where the regions are compressed using different compression techniques.

19 Claims, 5 Drawing Sheets

SYSTEM AND METHOD FOR MONOCHROME BINARY COMPRESSION ON LEGACY DEVICES

Disclosed is a system and method for monochrome or binary compression, and more particularly compression of binary images segmented in a binary domain into at least two regions of different image types, where the regions are compressed using different compression techniques.

BACKGROUND AND SUMMARY

There are typically two types of compression schemes for binary image data obtained from scanning operations in multifunction devices. One scheme is the straightforward compression using one binary compression algorithm, such as G3, G4, Deflate, or JBIG2 etc. The other scheme entails converting binary to two-layer black mask MRC scheme (as disclosed, for example, in U.S. Patent Publication 2004/0114195). In the latter scheme, the binary image is segmented into a foreground mask plane and a background image plane. The background plane is the image portion of the input document. The image portion of the document is first converted into continuous tone data, and is then compressed using JPEG, while the foreground mask plane, which represents the text and line art content of the page, is compressed using a binary compression algorithm, such G4, Deflate, or JBIG2.

The problem with the latter scheme described above is that it requires a good level of segmentation between text and image portions of the input document, especially trying to do so in a binary domain. The segmentation defects are tradeoff between achieving small file size and reasonable image quality in a cost-effective implementation.

U.S. Patent Publication 2004/0114195, for a "SYSTEM FOR SELECTING A COMPRESSION METHOD FOR IMAGE DATA," by F. F. Ebner et al., published Jun. 17, 2004, hereby incorporated by reference in its entirety, teaches a method of analyzing an image data set, performing a morphological operation on the image data, and then deriving a metric used to estimate compression performance.

U.S. Patent Publication 2005/0244060, for "REFORMATTING BINARY IMAGE DATA TO GENERATE SMALLER COMPRESSED IMAGE DATA SIZE," by Ramesh Nagarajan et al, published Nov. 3, 2005, also hereby incorporated by reference in its entirety, discloses systems and methods for reformatting binary image data into two or more planes to improve compression thereof.

The system and method disclosed herein include a lossless mixed raster content (MRC) generation scheme. Such a technique provides smaller file size and good image quality using a simple cost-effective implementation. It also does not require a complex image segmentation approach to achieve the desired file size improvement. In binary compression schemes, it is known that G4 (CCITT) and JBIG2 compression is good for text compression and G3 (CCITT) and Deflate compression performs better for image content. In general, each binary compression algorithm may be good for compressing either text or image, but not both.

One aspect of the present disclosure is to segment or predict the compression ratio of the mixed content binary image and divide the image into regions (e.g., region A, region B) and then deploy appropriate compression schemes for those regions to achieve better overall compression. In one embodiment, the regions are divided into a text portion and an image portion. The advantage of such a technique is that typical segmentation defects will not exist when the two compression schemes used for the regions of a page are lossless.

Disclosed in embodiments herein is a method for compressing binary image data, comprising: segmenting binary image data into a first plane having text and a second plane having an image; and separately compressing the text in the first plane and the image in the second plane.

Also disclosed in embodiments herein is a system for compressing binary image data, comprising: a segmenter for receiving binary image data and dividing said binary image data into a first plane having text and a second plane having an image; and a compressor for separately compressing the text in the first plane and the image in the second plane to produce reduced-size representations of said first and second planes.

Further disclosed in embodiments herein is multifunction apparatus for compressing binary image data, comprising: an image source of binary image data; memory for storing image data; a segmenter for retrieving binary image data from said memory and dividing said binary image data into a first plane having text and a second plane having an image; a compressor for separately compressing the text in the first plane and the image in the second plane to produce reduced-size representations of said first and second planes; and a controller for controlling the sequence of operation of at least said segmenter and compressor to produce a compressed image including reduced-size representations of said first and second planes.

DETAILED DESCRIPTION

In a mixed raster content compression system and method, one aspect is directed to deploying the best suitable compression technologies to compress different types of content inside the scanned document or image. The well-known continuous tone, or contone, image based mixed raster content scheme is used to compress the text and line arts (sharp edged, high frequency elements) using lossless compression and to compress the image content (low frequency elements) of the page using lossy compression to achieve good quality and a reasonable compression ratio compromise.

Figures 1, 2:
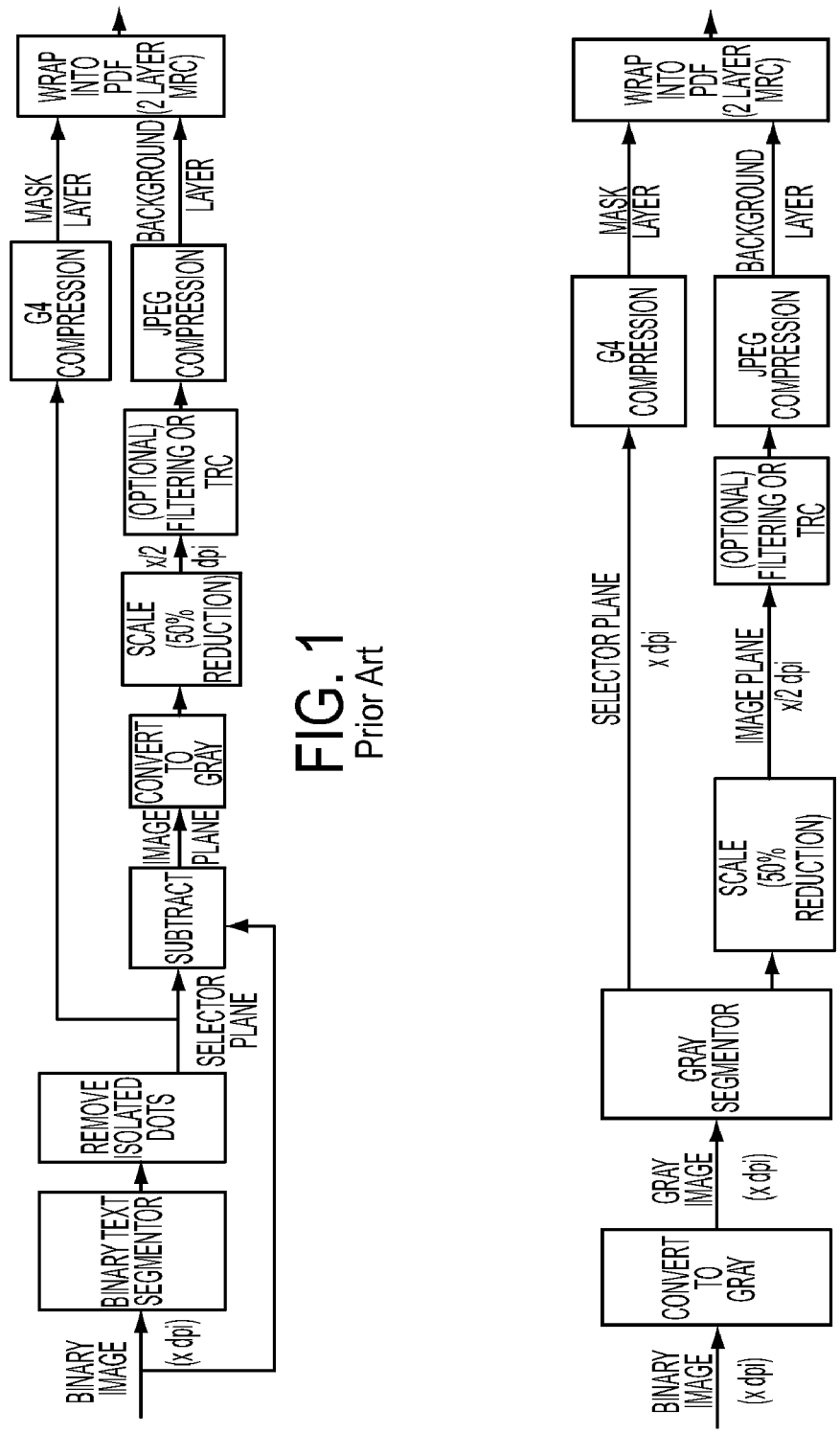
FIGS. 1 and 2 are illustrative examples of a bifurcated compression operation.

Referring to FIGS. 1 and 2, there are depicted flow diagrams illustrating the various components/steps employed for general binary MRC image compression scheme. As noted above, aspects of such schemes are disclosed in U.S. Patent Publication 2005/0244060. The two MRC compression schemes illustrated both output a grayscale background. The differences between the schemes illustrated in FIGS. 1 and 2 are where the binary to gray conversion is done and where in the pipeline the segmentation is done.

Within binary lossless image compression, different compression algorithms are good for different types of page content. For instance, relatively, CCITT-G4 compression is good at text compression while it is not as good at image content compression. On the other hand, CCITT-G3 and Deflate compressions are good at image content compression but are not as good for text compression.

Accordingly, in one embodiment of the disclosed system and method, the binary image is first segmented and then followed by compression—where the text and image portions of the scanned document use different types of binary compressions. This allows a better compression ratio of the binary file compared with using single compression to compress the whole page. The advantage of compressing both image (background) and text (foreground) using binary compression would result in a visually "segmentation defect free" output. The advantage is achieved because compression defects usually show up in the traditional two-layer, Black MRC compressed image where background is scaled, filtered and compressed, often introducing image defects or altering edge characteristics.

Figure 3:
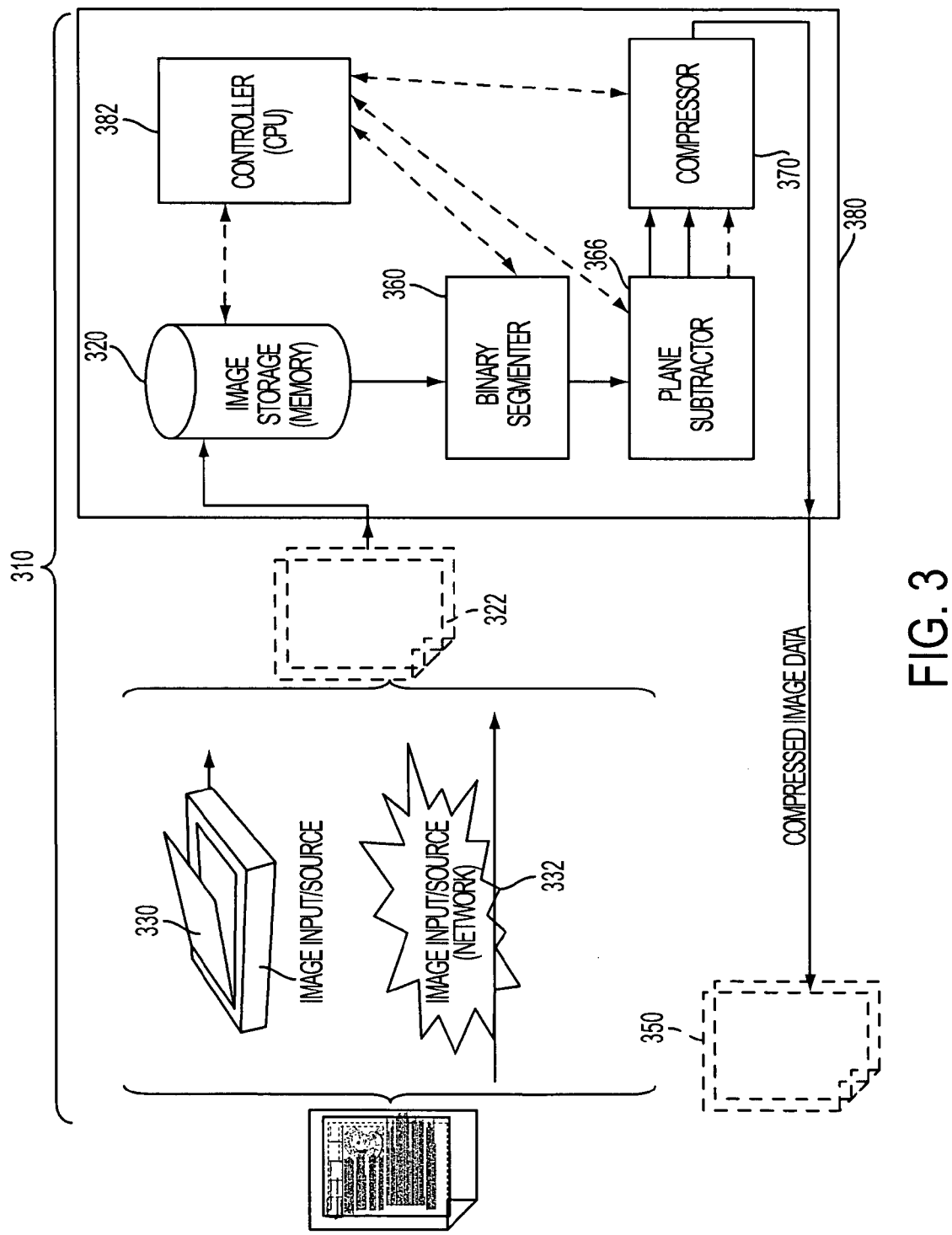
FIG. 3 is a schematic illustration of an exemplary multifunction device in which aspects of the disclosed system and method may be employed.

Referring to FIG. 3, there is depicted an exemplary system in which the methods described in detail below may be implemented. In one such system, for example a networked scanner or multi-function (e.g., scanning, printing and copying) apparatus 310 is employed to generate/receive, and store in memory 320 a digital image 322 that was obtained from a scanner 330 or similar digital input device (e.g., camera, etc.) via a network 332. The apparatus preferably operates on binary image data, and includes a segmenter 360 to segment the binary image data into image regions in a first plane and text regions in a second plane. Subsequently, a subtractor 366 separates the data as segmented, and then a compressor 370 compress the text region data in the first plane; and the contone image region data in the second plane. Although illustrated as a single compressor, it will be appreciated that a plurality of compressors may be implemented, each tuned to operate relative to the nature of data as will be described in further detail below. For example, alternative binary compression schemes (G3, G4, Deflate, JBIG2) may be employed for the respective image types to produce compressed image data 350. It will be further appreciated that the various functions described above may be implemented using conventional and/or custom hardware such as a computing workstation 380 operating under the control of one or more controllers 382 (e.g., I/O control, network and port interfaces, image processing, etc.).

In accordance with the system and method, deploying binary-only compression for both foreground and background layers does not mean the elimination of different levels of quality/file size options any more. First, the present system and method provide the advantage that both text and image can be processed after segmentation, and before the compression start. For example, the text could be enhanced and/or cleaned up.

Second, for the compression algorithm that allows lossy compression, such as JBIG2, a different dictionary may be used for text and image respectively. It will be understood that the JBIG2 standard for lossy and lossless bi-level image coding is a flexible encoding strategy based upon pattern matching. The encoder collects a set of symbols in a dictionary and encodes a page by reference to the dictionary symbols. JBIG2 allows the encoder to view all symbols and choose a good set for the dictionary. Hence, the current system and method contemplate the use of alternative dictionaries for JBIG2, depending upon whether the dictionary is to be employed for the text regions or the image regions.

Figure 4:
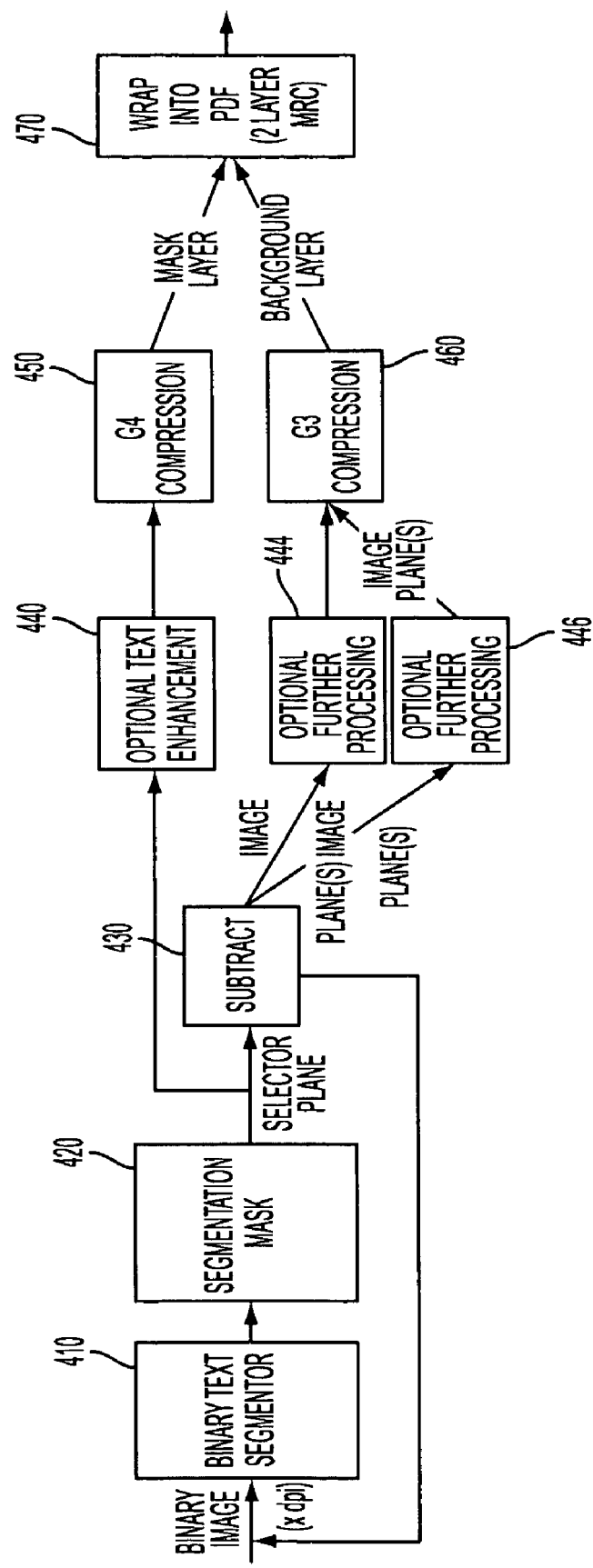
FIG. 4 is a flow diagram illustrating the sequence of operation of an embodiment of the disclosed method.

The compression parameters may also be tuned to cater to the specific content. For a binary only MRC compression scheme, in general, only one text plane is needed. There may be more than one image region(s) on the page. The present system and method further contemplates that each of these regions may, optionally, be independently compressed into a separate compressed plane. Referring to FIG. 4, there is depicted a general flow diagram depicting a pipeline of a multiple plane binary MRC scheme without a binary to gray conversion step. It is illustrated to output single mask plane and multiple image planes.

In FIG. 4, the binary image is received and segmented at binary segmenter 410. See FIG. 6, planes for text (610), and contone image (620). The output of the segmenter 410 is passed to a segmentation mask operation 420. In the segmentation mask, the planes of the image are defined relative to the segmented regions of the image (e.g., text, contone image). The text regions or planes for the image are then passed to option step 440, where they may be enhanced or similarly filtered, and then compressed at step 450 to produce the mask layer. In the parallel path, the image layer(s) are also optionally processed (444, 446) and then compressed at step 460. Optional processing may include, for example, edge enhancement, stray dot/mark removal, deskewing. In particular, various processing operations such as filtering that will result in improved compression outcomes is specifically contemplated.

In the embodiment depicted a CCITT G4 compression technique is employed in compression step 450, whereas a CCITT G3 compression operation is performed in step 460—both being optimized to compress the type of image data received. Subsequently, at step 470, the mixed raster content data is recombined or wrapped into a portable document format (PDF) file having at least two layers.

Figure 6:
FIG. 6 is an illustrative example of an image used in accordance with an experiment application of the systems and methods described herein.

One embodiment described above requires full-page segmentation in general. In such an embodiment, when the whole page buffer is not available, or full page based segmentation is not allowed due to limited memory, an alternative, memory efficient scheme can be deployed. Under memory efficient embodiment, the whole page is divided into bands, each with N scan lines, as depicted in FIG. 6 (e.g., 256 lines). Each band can then be segmented and compressed independently using the pipeline illustrated in FIG. 4.

In an alternative embodiment, a simpler segmentation implementation is employed. More specifically, before segmentation by the binary segmenter 410, the image is divided into bands and each band is further divided into blocks (e.g., blocks of width M as depicted in FIG. 6). Each block is stored in memory and then compressed in accordance with the appropriate (optimized) compression technique. Such a system and method could use a compression predictor as disclosed in U.S. Patent Publication 20040114195. Applying the predictor on each of the rectangular blocks would determine an optimal binary compression to be applied to the block. Moreover, it is also contemplated that adjacent blocks would be merged if they are assigned the same type of compression—the processing of a larger block of similar image type may lead to improved compression levels.

Figure 5:
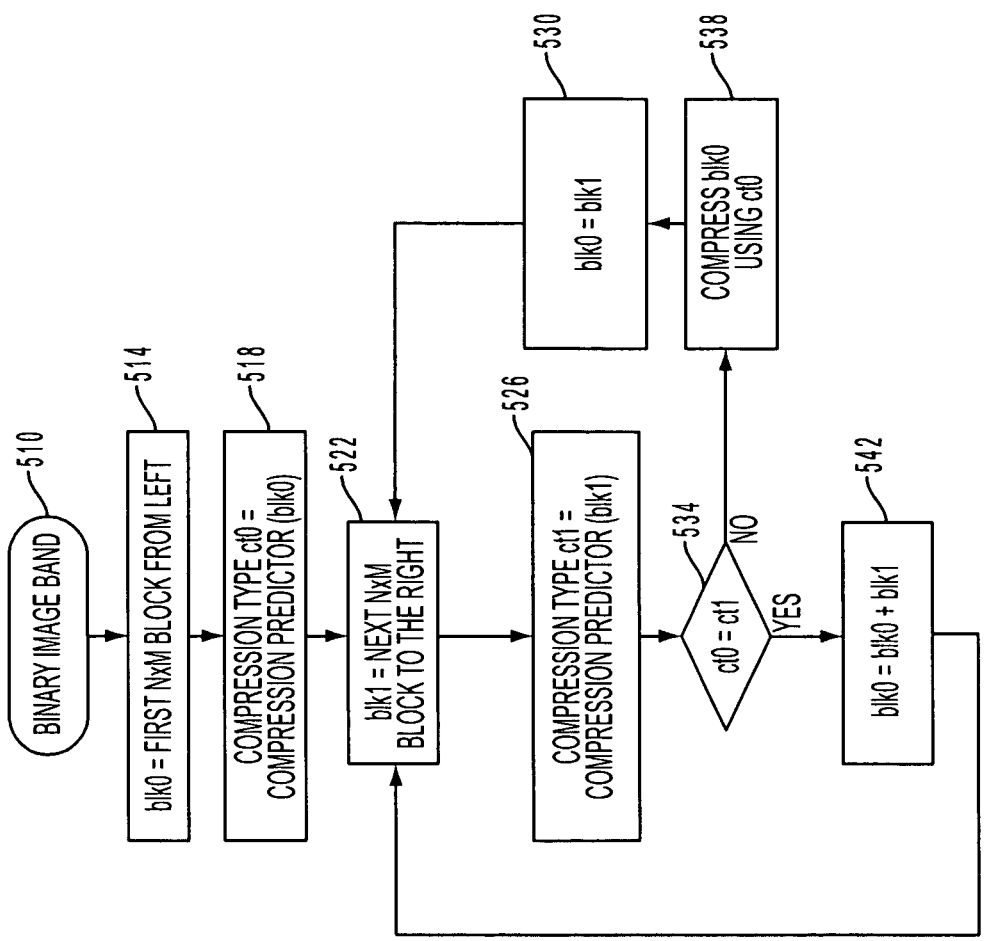
FIG. 5 is a flow diagram further illustrating an alternative embodiment of the disclosed method.

The processing for each band of the image in accordance with the block processing alternative is further illustrated in FIG. 5. Initially, at step 510, the binary image band is received. As noted above, the band may include 256 scan lines, but larger or smaller number of scan lines may be included. Next, at step 514, the band is divided into block of a width M. Once divided into N×M blocks, the block is analyzed at 518 to determine the predominant image type therein and to determine or predict the optimal compression technique to be used for the block. However, before beginning compression using the predict results from step 518, the next block is analyzed in a similar fashion at steps 522 and 526 to determine the optimal compression technique for the next block. Then at step 534, the compression technique (ct) results for each of the blocks is compared. If the results are the same, the blocks are combined at step 542, and the process is repeated beginning at step 522. Otherwise, if the techniques are not the same for both blocks, the first block is compressed at step 538, the second block becomes the first (step 530) and the process is repeated beginning at step 522 with a new second block. It should be further appreciated that the block merging operation of steps 526, 534 and 542 is optional, and may be disabled based upon memory resource constraints.

The following experiment was conducted to demonstrate the compression advantage of the system and method disclosed herein. A mixed content image such as that depicted in FIG. 6 was scanned at 300 dpi from a Xerox WorkCenter Pro C45 in black white mode. The image was processed using the pipeline detailed in FIG. 4 with different compression schemes. Table A lists the compressed file sizes of the full page, image portion, and text portion using G3, G4, and Deflate compression techniques (all lossless). The results show that the combination of Deflate compressed image and G4 compressed text, if merged into a single file, result in the smallest file size of 146K. Such processing represents approximately a thirty percent saving from the pure Deflate compression of the full page and about a sixty percent reduction from pure G4 compression of the full page. Today most of the scan to export solutions in multi-function devices try to optimize for text and only offer CCITT-G4 compression. Therefore, the present system and method would end up saving up to about sixty percent over the currently available compression options. It will be appreciated that different image/text content may lead to variable compression advantages, but the use of the afore-described techniques is anticipated to consistently provide some compression advantage.

TABLE A

File sizes after different compressions (in KB)

|  | Full image | Photographic portion | Text portion |
|---|---|---|---|
| G3 | 425 | 255 | 172 |
| G4 | 363 | 280 | 83 |
| Deflate | 207 | 63 | 135 |

A further advantage of the embodiments described herein is that they may be easily implemented in legacy monochrome devices that generate binary files today. Implementation of the disclosed methodology does not require changes to the hardware of most multi-function devices, and can be implemented through software upgrades and installations.

The embodiments disclosed herein are not intended to limit the usage of the disclosed system and method to multi-function devices. Rather, the aforementioned segmentation and compression technology can also be used as a client-server or web-server based service for customers wishing to convert their legacy compression files into more compact size versions, thereby reducing the storage cost. Also since one method is lossless and reduces the file sizes, this method could provide an alternate intermediate binary storage format for many of the multifunction devices. Furthermore, although the examples disclosed are directed to monochrome, binary images, it will be appreciated that the techniques disclosed may also be applied to color binary representation schemes, such as CMYK 1 bit.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for compressing binary image data, comprising:

using a computer, dividing the binary image into a plurality of bands, each of said bands having a plurality of blocks therein;

using the computer determining an optimal compression technique for each of the blocks, and for adjacent blocks having a common optimal compression technique, recombining said blocks into a single block, and thereby segmenting the binary image data into high-frequency information regions and low frequency information regions;

subtracting the high-frequency information regions and low frequency information regions from the segmented binary image data to produce at least a first binary data plane having high-frequency information and a second binary data plane having low frequency information; and separately compressing the first binary data plane and the second binary data plane using said computer and the optimal compression techniques, where both the first and second binary data planes are compressed using binary compression techniques and wherein at least one plane is compressed using a lossless binary compression technique to produce a mixed raster content output.

2. The method of claim 1, further comprising receiving the results of the separately compressing operation and, using the computer, recombining the results into a single mixed raster content output file.

3. The method of claim 2, further comprising storing only successive bands of the single mixed raster content output file in memory as binary image data.

4. The method of claim 2, wherein the first binary data plane is compressed with a first compression technique and the second binary data plane is compressed with a different compression technique.

5. The method of claim 4, wherein the first compression technique provides improved compression of text regions in an image relative to the different compression technique and where the different compression technique provides improved compression of image regions in an image relative to the first compression technique.

6. The method of claim 1, further comprising further processing at least one of the first binary data plane having text and the second binary data plane having an image prior to compression thereof.

7. The method of claim 1, wherein segmenting binary image data further includes dividing the image into a plurality of blocks of binary image data.

8. The method of claim 7, further including analyzing adjacent blocks to determine an optimal compression technique for each block, and where adjacent blocks having the same optimal compression technique are recombined prior to compression thereof.

9. The method of claim 1, wherein the first binary data plane is compressed with the lossless binary compression technique and the second binary data plane is compressed with a lossy binary compression technique.

10. The method of claim 9, wherein the lossless compression includes JBIG2 compression using a first dictionary and the lossy compression includes JBIG2 compression technique using a second dictionary.

11. A system for compressing binary image data, comprising:
- a segmenter receiving binary image data, said segmenter including a computer and associated memory, said segmenter dividing the binary image into a plurality of bands and storing data for the bands in the memory, at least one of said bands having a plurality of blocks therein;
- a compression technique analyzer analyzing and determining an optimal compression technique for each of the blocks, and recombining adjacent blocks having a common optimal compression technique into a single block, said segmenter thereby segmenting and dividing said binary image data into a first binary data plane having text and a second binary data plane having an image; and
- a binary data compressor separately compressing the text in the first binary data plane and the image in the second binary data plane to produce reduced-size representations of said first and second binary data planes, said compressor subtracting high-frequency information regions having text and low frequency information regions having an image from the segmented binary image data to produce at least a first binary data plane having high-frequency information and a second binary data plane having low frequency, information, and separately compressing the first binary data plane and the second binary data plane, where both the first and second binary data planes are compressed using binary compression techniques.

12. The system of claim 11, wherein the compressor performs at least two alternate compression schemes to compress the first binary data plane with a first compression technique and the second binary data plane with a different compression technique.

13. The system of claim 12, wherein the first compression technique is optimized for compression of text regions relative to the different compression technique and where the different compression technique is optimized for compression of image regions in an image relative to the first compression technique.

14. The system of claim 11, further comprising a filter for processing at least one of the binary data planes after segmentation but prior to compression thereof.

15. A multifunction apparatus for compressing binary image data, comprising:
- an image source of binary image data;
- memory storing image data;
- a segmenter retrieving binary image data from said memory, said segmenter processing the binary image as a plurality of bands and storing data for the bands in the memory, at least one of said bands having a plurality of blocks therein, and said segmenter determining an optimal compression technique for each of the blocks, and recombining adjacent blocks having a common optimal compression technique into a single block, and thereby segmenting and dividing said binary image data into a first binary data plane having text and a second binary data plane having an image;
- a compressor separately compressing the text in the first binary data plane and the image in the second binary data plane to produce reduced-size representations of said first and second binary data planes; and
- a controller controlling the sequence of operation of at least said segmenter and compressor to produce a compressed image including reduced-size representations of said first and second binary data planes.

16. The multifunction apparatus of claim 15, wherein the compressor performs at least two alternate compression schemes to compress the first binary data plane with a first compression technique and the second binary data plane with a different compression technique.

17. The multifunction apparatus of claim 16, wherein the first compression technique is optimized for compression of text regions relative to the different compression technique and where the different compression technique is optimized for compression of image regions in an image relative to the first compression technique.

18. The multifunction apparatus of claim 15, further comprising a filter for processing at least one of planes after segmentation but prior to compression thereof.

19. The multifunction apparatus of claim 15, further including a compression technique analyzer, wherein adjacent blocks are analyzed to determine an optimal compression technique for each block, and where adjacent blocks having the same optimal compression technique are recombined prior to compression.

* * * * *